(12) United States Patent
Iguchi

(10) Patent No.: US 8,449,195 B2
(45) Date of Patent: May 28, 2013

(54) RETAINER OF BALL BEARING

(75) Inventor: Masashi Iguchi, Osaka (JP)

(73) Assignee: Osaka Vacuum, Ltd. (JP)

( * ) Notice: Subject to any disclaimer, the term of this patent is extended or adjusted under 35 U.S.C. 154(b) by 324 days.

(21) Appl. No.: 12/516,330

(22) PCT Filed: Nov. 21, 2007

(86) PCT No.: PCT/JP2007/072536
§ 371 (c)(1),
(2), (4) Date: May 26, 2009

(87) PCT Pub. No.: WO2008/065943
PCT Pub. Date: Jun. 5, 2008

(65) Prior Publication Data
US 2010/0061673 A1 Mar. 11, 2010

(30) Foreign Application Priority Data

Nov. 27, 2006 (JP) .................................. 2006-318010
Oct. 2, 2007 (JP) .................................. 2007-258736

(51) Int. Cl.
*F16C 19/00* (2006.01)
*F16C 33/66* (2006.01)
(52) U.S. Cl.
CPC .................................. *F16C 33/6614* (2013.01)
USPC .......................................... 384/470; 384/523
(58) Field of Classification Search
USPC ................. 384/463, 470, 523, 528, 530, 614, 384/623
See application file for complete search history.

(56) References Cited

U.S. PATENT DOCUMENTS

| 3,051,534 | A  | * | 8/1962  | Kohler et al.      | 384/576 |
| 3,450,449 | A  | * | 6/1969  | Sibley et al.      | 384/465 |
| 4,886,379 | A  | * | 12/1989 | Bayer              | 384/523 |
| 6,206,575 | B1 | * | 3/2001  | Matsushita et al.  | 384/523 |
| 6,461,049 | B2 | * | 10/2002 | Straub et al.      | 384/470 |
| 2003/0098182 | A1 |   | 5/2003  | Ehler et al.       |         |

FOREIGN PATENT DOCUMENTS

| CN | 2813982  | Y |   | 9/2006  |
| GB | 961203   |   |   | 6/1964  |
| GB | 1353045  |   |   | 9/1971  |
| JP | 60084824 | U | * | 6/1985  |
| JP | 62110626 | U | * | 7/1987  |
| JP | H0673442 | U | * | 10/1994 |

(Continued)

OTHER PUBLICATIONS

European Search Report issued Oct. 23, 2012 in connection with related European Patent Application No. 07832266.6.

*Primary Examiner* — James Pilkington
(74) *Attorney, Agent, or Firm* — Berliner & Associates

(57) ABSTRACT

In a grease filled bearing for a machine such as a turbo molecular pump that rotates at high speed, objects are to prevent grease retained in an inner circumferential part of a ball retainer from being forced out to the outside of the bearing due to centrifugal force, thereby achieving extension of the operational life of the bearing, and preventing occurrence of rotational mass unbalance due to the grease forced out. A retainer (1) of a ball bearing includes a main body (1A) having a circular annular shape, and plural circular pockets (1a) for retaining balls (4) therein that extend through the main body (1A) in a radial direction, wherein intermediate parts between adjacent pockets (1a) in an inner circumferential surface of the main body (1A) define recesses (1b) for holding grease.

4 Claims, 3 Drawing Sheets

FOREIGN PATENT DOCUMENTS

| | | | |
|---|---|---|---|
| JP | 2001140898 | | 5/2001 |
| JP | 2003090344 | | 3/2003 |
| JP | 2005090658 A | * | 4/2005 |
| JP | 2005-214257 | | 8/2005 |
| JP | 2006200674 A | * | 8/2006 |
| JP | 2006250169 A | * | 9/2006 |

* cited by examiner

RETAINER OF BALL BEARING

BACKGROUND

1. Technical Field

The present invention relates to a retainer of a roller bearing, such as a radial ball bearing and a radial roller bearing, and particularly to a retainer of a sealed bearing with grease filled therein or a retainer for balls or rollers of a sealed bearing.

2. Background Art

A radial ball bearing has a retainer for retaining therein plural balls that are arranged in a freely rotatable manner in a circumferential direction between an outer ring and an inner ring.

A sealed bearing with grease filled therein has seal rings, such as those made of iron plate, arranged on both the lateral end surfaces between the outer ring and the inner ring to prevent leakage of grease filled inside of the bearing. There is an example of such a roller bearing, in which an inside space of a retainer of a ball bearing is increased to increase the durability of the ball bearing (e.g., Patent Document 1: Japanese Patent Application Laid-open No. 2005-214257).

SUMMARY

Problems that the Invention is to Solve

There was a problem associated with a mechanical grease-filled seal bearing of a machine, such as a turbo molecular pump that rotates at high speed, in which although grease is mainly retained in an inner peripheral part of the retainer, the grease may be forced out of the bearing from the inner peripheral part, and thereby the operational life of the bearing is shortened.

The above problem is not avoidable in a case where the inside space of the retainer is directly opened to pocket holes with balls therein and openings of the lateral sides of the retainer, such as a retainer and a ball bearing described in the above Patent Document 1. Even when the amount of grease filled in the inside of the retainer is large, it was assumed that leakage of grease caused by the high speed rotation shortens the operational life of the bearing.

Furthermore, in a mechanical seal bearing that rotates at high speed, there was a problem in which rotational mass unbalance takes place in a retainer by the grease forced out and hence vibration is caused in a bearing portion.

An object of the present invention is to provide a retainer of a ball bearing that is capable of solving those problems, and preventing such leakage of grease filled in a seal bearing as well as extending the life of the bearing.

Means to Solve the Problems

In order to accomplish the above object, there is provided a retainer of a ball bearing of the present invention that includes a main body having a circular annular shape, and plural circular pockets that extend through the main body in a radial direction for retaining balls therein, wherein intermediate parts between adjacent pockets in an inner circumferential surface of the main body define recesses for holding grease.

Advantages of the Invention

The present invention produces an advantageous effect in which grease is held in the recesses in the inner circumferential part of the retainer, thereby the grease is unlikely to be forced out even by centrifugal force applied during the high-speed rotation and hence the grease remaining period is elongated, and supply of grease to the surfaces of the balls is continued for an elongated period of time and thereby elongate the operational life of the bearing.

DETAILED DESCRIPTION

Description of Reference Numerals

Figure 1:
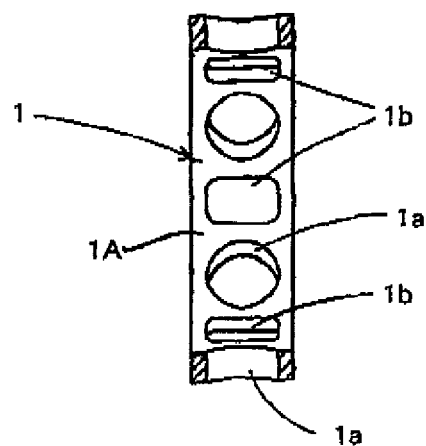
FIG. 1 is a vertical cross sectional view of a retainer of Embodiment 1.

Reference numerals refer to the following:
1, 7, 11: retainers;
1A, 7A, 11A: main bodies;
1a, 7a, 11a: pockets;
1b, 7b, 11b: recesses; and
B: ball bearing.

BEST MODE FOR CARRYING OUT THE INVENTION

Hereinafter, the best mode for carrying out the present invention will be described.

Embodiment 1

Embodiment 1 of the present invention will be described with reference to FIGS. 1 to 3.

Figure 2:
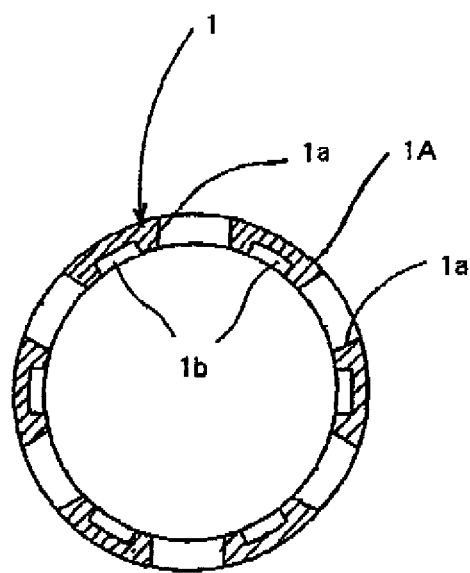
FIG. 2 is a lateral cross sectional view of the retainer.

FIG. 1 is a vertical cross sectional view of a retainer 1 of this embodiment, and FIG. 2 is a lateral cross sectional view of the retainer 1.

The retainer 1 is composed of a main body 1A having a circular annular shape, and the main body 1A is made of a composite material such as a cloth-containing phenol resin and is formed to have a permeability to a grease base oil.

A reference numeral 1a represents a circular pocket for holding balls, and each of these pockets 1 extends through the main body 1A in a radial direction and has an inner circumference having a cylindrical shape.

A reference numeral 1b represents a recess having a substantially square shape, and each of these recesses 1b is formed at an intermediate part between the corresponding adjacent pockets 1a, 1a on the inner circumferential surface of the main body 1A.

The depth of each recess 1b is set to be, for example, half of the thickness of the main body 1A so as not to cause influences on the strength of the main body 1A.

Now, the description will be made for a method of using the retainer 1 of the present invention. FIG. 3 shows a vertical cross sectional view of a ball bearing B using the retainer 1.

Figure 3:
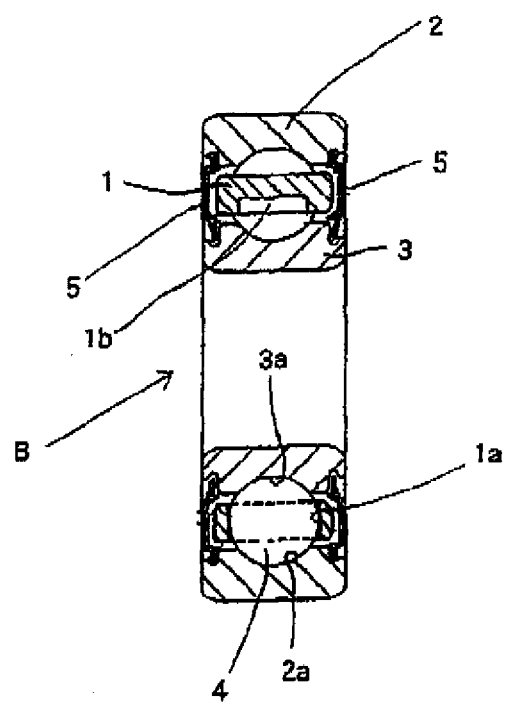
FIG. 3 is a vertical cross sectional view of a ball bearing using the retainer.

In FIG. 3, a reference numeral 2 represents an outer ring, and 3 represents an inner ring, in which the retainer 1 is interposed between the outer ring 2 and the inner ring 3. A ball 4 is interposed between a circular groove 2a of an inner circumference of the outer ring 2 and a circular groove 3a of an outer circumference of the inner ring 3 and is retained to be rollable in the retainer 1, and more specifically in each of the pockets 1a of the main body 1A.

Seal rings 5 are respectively mounted to opposite lateral end surfaces between the outer ring 2 and the inner ring 3 and are each made of an iron plate or the like.

These seal rings 5 are held to have at least an outer circumferential portion thereof held in tight contact with the outer ring 2 to thereby prevent leakage of grease filled in the ball bearing B.

The grease is also filled in a peripheral portion of the main body 1A, as well as in the recesses 1b of the main body 1A.

Upon rotation of the inner ring 3 or the outer ring 2, of the ball bearing B, the main body 1A and more specifically the retainer 1 is rotated at a speed slighter slower than those rings. In a case where the inner ring 3 or the outer ring 2 is rotated at high speed, the retainer 1 is also rotated at high speed. Since the grease held in the recesses 1b are unlikely to be forced out of the recesses 1b to the outside even by centrifugal force at high speed, the grease remains in the ball bearing B for an elongated period of time. As a result, the grease base oil transmits through the cloth of the composite material of the retainer 1 and hence is supplied to the surface of each ball 4 for an elongated period of time, which produces an advantageous effect in which the operational life of the ball bearing B is extended.

Since the grease held in the recesses 1b is unlikely to be forced out of the main body 1A or the retainer 1, unbalance is not caused in the ball bearing B to thereby produce an advantageous effect in which occurrence of vibration of the ball bearing due to the grease forced out is eliminated.

Embodiment 2

The description will be made for Embodiment 2 of the present invention with reference to FIG. 4.

Figure 4:
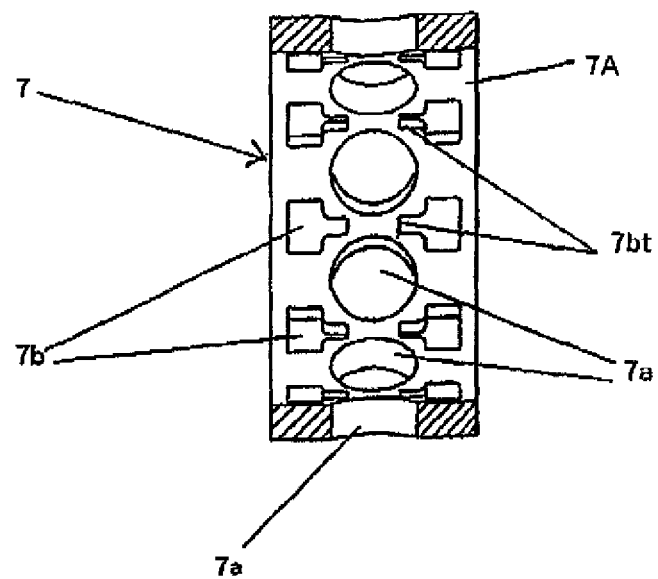
FIG. 4 is a vertical cross sectional view of a retainer of Embodiment 2.

FIG. 4 is a vertical cross sectional view of a retainer 7 of this embodiment.

The retainer 7 is composed of a main body 7A having a circular annular shape, and the main body 7A is made of a composite material such as a cloth-containing phenol resin and is formed to have a large width.

Plural pockets 7a having a cylindrical shape for retaining balls extend through the main body 7A in a radial direction.

A reference numeral 7b represents a recess and each of these recesses 1b has a substantially square shape with a thin projection 7bt projecting from one side of the square, and these recesses 7b are arranged symmetrical to each other on both the lateral sides relative to the center line connecting the center portions of the pockets 7a of the inner circumferential surface of the main body 7A. The depth of the recesses 7b is set to be, for example, about half of the thickness of the main body 7A.

Each pair of the laterally opposite recesses 7b, 7b and each pocket 7a are alternatively arranged along the circumference of the inner circumferential surface of the main body 7A.

Now, the description will be made for a method of using the retainer 7 of this embodiment and its advantageous effects.

The retainer 7 is also used in the same manner as the retainer 1 of Embodiment 1.

The main body 7A of the retainer 7 of this embodiment is arranged to have the thin projections 7bt of the recesses 7b facing each other, so that even where the distance between the adjacent pockets 7a for ball retaining is small, it is possible to ensure a large area for each recess 7b. Since the projections 7bt of the recesses 7b extend into the inside of the lines of the pockets 7a, a grease base oil stored in the projections 7bt permeates inside of the cloth of the retainer 7 and reaches the pockets 7a by centrifugal force, thereby producing advantageous effects in which the lubrication of the surface of the ball 4 within each pocket 7a. can be satisfactorily made and hence the operational life of the bearing can be extended.

In this embodiment, the recesses 7b are symmetrically arranged to face each other on the opposite lateral sides relative to the center line connecting the center portions of the pockets 7a, while it is possible to employ an arrangement, in which the recesses 7b are arranged on either lateral side relative to the center line.

Embodiment 3

The description will be made for Embodiment 3 of the present invention with reference to FIGS. 5 and 6.

Figure 5:
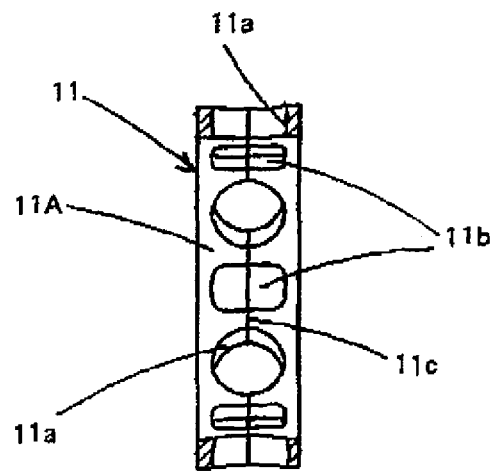
FIG. 5 is a vertical cross sectional view of a retainer of Embodiment 3.
Figure 6:
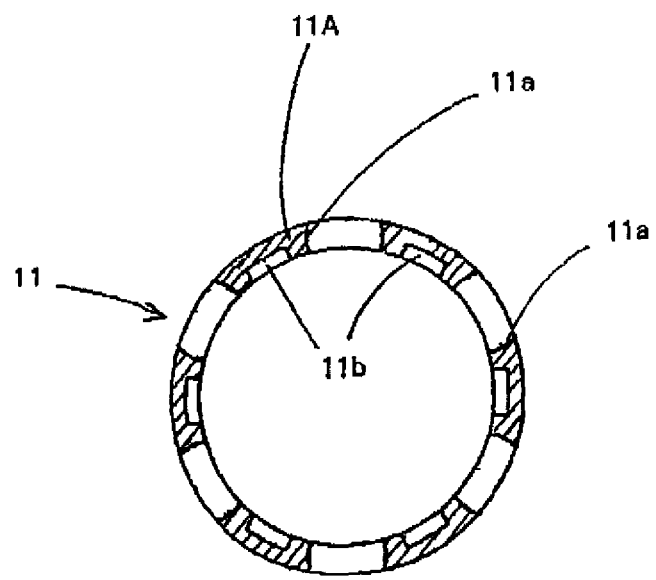
FIG. 6 is a lateral cross sectional view of the retainer of FIG. 5.

FIG. 5 is a vertical cross sectional view of a retainer 11 of this embodiment, and FIG. 6 is a lateral cross sectional view of the retainer 11.

A main body 11A having a circular annular shape of the retainer 11 of this embodiment is configured to have an inner circumferential surface of each pocket 11a for retaining a ball therein formed into a spherical concave shape corresponding to the ball.

The retainer 11 is configured to be dividable into two pieces and a reference numeral 11c represents a joint portion of them.

The recesses 11b each have the same shape as that of the recesses 1b of Embodiment 1.

The spherical shape of the pockets 11a for retaining the balls therein prevents the retainer 11 from vibrating in the radial direction.

The retainer 11 is also used in the same manner as the retainer 1 of Embodiment 1 or Embodiment 2.

Embodiments 1 to 3 were described by taking, for example, the case in which a radial ball bearing is used, while it is possible to form plural recesses for grease storage in an inner circumferential surface of a retainer of a radial roller bearing.

Instead of the alternative arrangement of the pockets and the recesses, the recesses themselves may be alternatively arranged.

INDUSTRIAL APPLICABILITY

The present invention is utilized for a grease-filled bearing for use in a rotational shaft or the like of a tube molecular pump that rotates at high speed.

The invention claimed is:

1. A retainer of a ball bearing comprising a main body having a circular annular shape, and plural circular pockets that extend through the main body in a radial direction for retaining balls therein, wherein intermediate parts between adjacent pockets in an inner circumferential surface of the main body define recesses for holding grease, wherein the recesses are formed at the inner circumferential surface of the main body so as to pass partly through the main body, the recesses each are formed into a substantially square shape when viewed from the inner circumferential surface, the substantially square shape being closed at a first side facing an outer edge of the inner circumferential surface, and the substantially square shaped recesses each have an opening projecting from another side of each of the recesses, the projecting opening extending toward a center line of the inner circumferential surface of the main body, and wherein a composite material is used for the main body, thereby enabling a grease base oil to permeate therethrough, wherein the composite material is a cloth-containing phenol resin.

2. A retainer of a ball bearing according to claim 1, wherein the recesses are arranged on any of one lateral side or both lateral sides relative to the center line drawn in the circumferential direction on the inner circumferential surface of the main body, the center line connecting center portions of the plural pockets.

3. A retainer of a ball bearing according to claim 1, wherein an inner circumferential surface of each of the pockets is formed into a cylindrical shape.

4. A retainer of a ball bearing according to claim 1, wherein an inner circumferential surface of each of the pockets is formed into a spherical concave shape.

* * * * *